(12) United States Patent
Van Der Zwan et al.

(10) Patent No.: US 12,539,081 B2
(45) Date of Patent: Feb. 3, 2026

(54) DRINKING BEHAVIOR MONITORING DEVICE

(71) Applicant: KONINKLIJKE PHILIPS N.V., Eindhoven (NL)

(72) Inventors: Eduard Antonius Van Der Zwan, Groningen (NL); Johannes Tseard Van Der Kooi, Munein (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 995 days.

(21) Appl. No.: 17/285,930

(22) PCT Filed: Nov. 26, 2019

(86) PCT No.: PCT/EP2019/082526
§ 371 (c)(1),
(2) Date: Apr. 16, 2021

(87) PCT Pub. No.: WO2020/120120
PCT Pub. Date: Jun. 18, 2020

(65) Prior Publication Data
US 2021/0386370 A1 Dec. 16, 2021

(30) Foreign Application Priority Data
Dec. 12, 2018 (EP) .................................... 18211883

(51) Int. Cl.
*A61B 5/04* (2006.01)
*A61B 5/00* (2006.01)
(Continued)

(52) U.S. Cl.
CPC ............ *A61B 5/4884* (2013.01); *A61B 5/024* (2013.01); *A61B 5/6887* (2013.01); *A61B 5/74* (2013.01);
(Continued)

(58) Field of Classification Search
None
See application file for complete search history.

(56) References Cited

U.S. PATENT DOCUMENTS

| 4,232,687 A | 11/1980 | Anderson-Shanklin |
| 4,796,628 A * | 1/1989 | Anderson ........... A61J 15/0084 606/236 |

(Continued)

FOREIGN PATENT DOCUMENTS

| WO | 0009006 | 2/2000 |
| WO | 2009132334 | 10/2009 |

OTHER PUBLICATIONS

International Search Report and Written Opinion Dated Jan. 30, 2020 For International Application No. PCT/EP2019/082526 Filed Nov. 26, 2019.

*Primary Examiner* — Ankit D Tejani

(57) ABSTRACT

A drinking behavior monitoring device is provided which comprises a stress level detection sensor (300) detecting a stress level of a baby (20), a suction frequency detection sensor (200) detecting a suction frequency during a feeding of the baby and an analyzer (400) analyzing a drinking behavior of a baby based on the detected stress level and the detected suction frequency. The analyzer (400) compares the analyzed drinking behavior with a typical or predetermined drinking behavior and can output a notification based on the analyzed drinking behavior.

20 Claims, 2 Drawing Sheets

(51) Int. Cl.
*A61B 5/024* (2006.01)
*A61J 9/00* (2006.01)

(52) U.S. Cl.
CPC ............. *A61J 9/00* (2013.01); *A61B 2503/04* (2013.01); *A61B 2562/0247* (2013.01); *A61J 2200/70* (2013.01)

(56) References Cited

U.S. PATENT DOCUMENTS

| | | |
|---|---|---|
| 6,033,367 A | 3/2000 | Goldfield |
| 2008/0039778 A1 | 2/2008 | Goldie |
| 2012/0157757 A1 | 6/2012 | Ten Eyck et al. |
| 2015/0208979 A1 | 7/2015 | Cunningham |
| 2017/0188936 A1 | 7/2017 | Lau |
| 2018/0243173 A1 | 8/2018 | Kessels |

* cited by examiner

DRINKING BEHAVIOR MONITORING DEVICE

CROSS REFERENCE TO RELATED APPLICATIONS

This application is the U.S. National Phase application under 35 U.S.C. § 371 of International Application No. PCT/EP2019/082526 filed Nov. 26, 2019, which claims the benefit of European Patent Application Number 18211883.6 filed Dec. 12, 2018. These applications are hereby incorporated by reference herein.

FIELD OF THE INVENTION

The invention relates to a drinking behavior monitoring device, a method of monitoring a drinking behavior of a baby and a baby drinking bottle.

BACKGROUND OF THE INVENTION

Typically, a baby bottle with a teat is used for feeding a baby. In particular, such a baby bottle is used to feed milk to the baby. While with breast feeding, the baby can adjust the flow rate itself, this is not as easily possible when a baby bottle is used. Here, the flow rate is determined by the teat (in particular the size of apertures/holes and number of apertures/holes) and by the underpressure which is applied by the baby. If the teat has too many holes/apertures or if the holes are too big, then the flow rate will be too large which can lead to a spoilage of milk. However, if the holes are too small, the flow rate will be too low and the baby will not receive enough milk and therefore enough nutrition.

In particular, for new parents it is difficult to determine whether the drinking behavior of the baby is sufficient or correct or not. It is sometimes very difficult for new parents to interpret the clues that the baby is giving during the drinking procedure correctly. New parents could often wonder whether the baby is drinking enough and whether the baby is sucking in too much air. Therefore, it would be helpful for the parents to have an indication of the drinking behavior.

US 2015/0208979 A1 discloses an apparatus for evaluating the tongue strength and coordination of a baby during the drinking procedure. An optical sensing device is provided to detect a deformation of a nipple element. Furthermore, an indication of which type of nipple element is to be used can be outputted.

US 2008/0039778 discloses a computer controlled bottle system, in particular for preterm infants, which monitors sucking pressure and breathing characteristics to control milk delivery to the infant. It also determines when the preterm infant no longer needs active bottle assistance.

US 2018/0243173 discloses a bottle having sensors for monitoring bottle parameters such as pressure, flow and temperature, in order to monitor the amount being drunk. Advice may then be given to change to a different teat.

SUMMARY OF THE INVENTION

It is therefore an object of the invention to provide a drinking behavior monitoring device which can effectively monitor a behavior of a baby during a drinking phase.

The invention is defined by the claims.

According to an aspect of the invention, a drinking behavior monitoring device is provided. The monitoring device comprises a stress level detection sensor discriminating between at least a high stress level and a low stress level, stress being indicative of the milk flow rate being too low or too high, a suction frequency detection sensor detecting a suction frequency during the feeding of a baby and an analyzer analyzing a drinking behavior of a baby based on the detected stress level and the detected suction frequency. The analyzer compares the analyzed drinking behavior with a typical or predetermined drinking behavior and can output a notification based on the analyzed drinking behavior based on whether the flow rate is too low or too high. Thus, a non-obtrusive drinking behavior monitoring device can be provided to detect and analyze the drinking behavior of a baby.

According to an embodiment, the stress level detection sensor is configured to detect a stress level of a baby during a feeding process with a baby bottle having a teat and the suction frequency detection sensor is configured to detect a suction frequency during the feeding of a baby with a baby bottle.

According to an embodiment, the analyzer can output a recommendation to change a teat of a baby bottle if the analyzed drinking behavior does not correspond to a predetermined or typical drinking behavior. Thus, the parents of the baby may receive valuable information regarding which teat to use.

According to an embodiment of the invention, the teat is able to adapt a flow rate and the analyzer outputs a recommendation to adapt the flow rate of the teat of the baby bottle. Thus, the flow rate can be adapted automatically without any interaction from the parents of a baby.

According to an aspect of the invention, a method of monitoring a drinking behavior of a baby using a baby bottle having a teat is provided. Stress levels of the baby are detected with a stress level detection sensor thereby to discriminate between at least a high stress level and a low stress level, stress being indicative of the milk flow rate being too low or too high. A suction frequency of the baby is detected with a suction frequency sensor. A drinking behavior of the baby is determined based on the detected stress level and the detected suction frequency. The drinking behavior is compared to a typical or predetermined drinking behavior and a notification can be outputted if the current drinking behavior differs from the predetermined drinking behavior. Accordingly, a non-obtrusive monitoring of the drinking behavior of a baby can be provided, while valuable information can be obtained regarding the optimal teat for the baby bottle.

According to an embodiment, a recommendation regarding a change of the teat as used in the baby bottle can be outputted based on the drinking behavior of the baby. Thus, the parents of a baby which is fed with the baby bottle can receive valuable information regarding which teat to use.

The stress level detection sensor can be embodied as a vital signs sensor like a heartrate sensor. The heartrate sensor can for example be implemented as a wrist device with the heartrate sensor which could be attached to the wrist of the baby during the feeding procedure.

The suction frequency sensor can be implemented as an optical sensor optically detecting changes of the baby, as an audible sensor (like a microphone) detecting drinking noises or as a pressure sensor detecting pressure differences or as an accelerometer on the bottle.

The stress level as detected by the stress level detection sensor and the suction frequency as detected by the suction frequency sensor can be forwarded to an analyzer, where the suction frequency and the stress level are analyzed in order to determine a drinking behavior of the baby. The determined drinking behavior is compared to a typical or predetermined drinking behavior and a notification is outputted if the detected drinking behavior does not correspond to the typical or predetermined drinking behavior.

According to an embodiment, a method of monitoring a drinking behavior of a baby with a baby bottle is provided. Based on the monitoring of the drinking behavior, increased stress levels of the infant may indicate a non-optimal flow while an increased suction frequency may indicate that the flow rate is too low. Knowledge of this analysis can be used to inform the parent in choosing the optimal teat for the baby bottle.

According to an embodiment, a drinking behavior monitoring device and a method of monitoring a drinking behavior of a baby are provided. The monitoring device is used to help parents judge whether the currently used teat is the right one. As in particular new parents have difficulties in determining whether the baby is content during the drinking procedure, the drinking behavior monitoring device can give the parents some guidance. It should be noted that typically every baby has its own drinking behavior leading to a baby specific flow rate during the drinking procedure. The monitoring device and the method of monitoring a drinking behavior of a baby are provided to enable the parents to judge whether the current milk flow is sufficient for the baby. If the current drinking behavior is not sufficient, the teat can be exchanged. In particular, by means of the monitoring device, the drinking behavior can be determined, e.g. whether the flow rate is too low, sufficient or too high. Hence, a distinction can be made between a flow rate that is too low, sufficient or too high.

According to an embodiment, a baby bottle with an adaptable flow rate is provided. The adaptation of the flow rate may be controlled based on the drinking behavior of the baby which can be determined by detected stress levels and detected suction frequencies.

Accordingly, the drinking behavior can be feedback to the baby drinking bottle to adapt the flow rate. This is advantageous as only one teat is used and the parents do not have to exchange the teats.

According to an embodiment, the analyzer analyzes the drinking behavior like a flow rate or estimates a flow rate of a bottle based on the detected stress level and the suction frequency. The analyzer can then output a notification if the analyzed drinking behavior is not sufficient, e.g. if the flow rate is too low or too high. The analyzer is used to analyze a feedback of a baby in the sense of its stress level and the suction frequency. These two feedback factors of the baby can be used to determine whether the current drinking bottle arrangement is the correct one for the time being.

In particular, the reactions of the baby are determined like the stress level and the suction frequency and based on these reactions or feedback indications, the analyzer can analyze the current drinking behavior to determine whether the current drinking behavior is sufficient or not. A notification can be output if the drinking behavior is sufficient or if the drinking behavior is not sufficient (flow rate too high or too low).

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
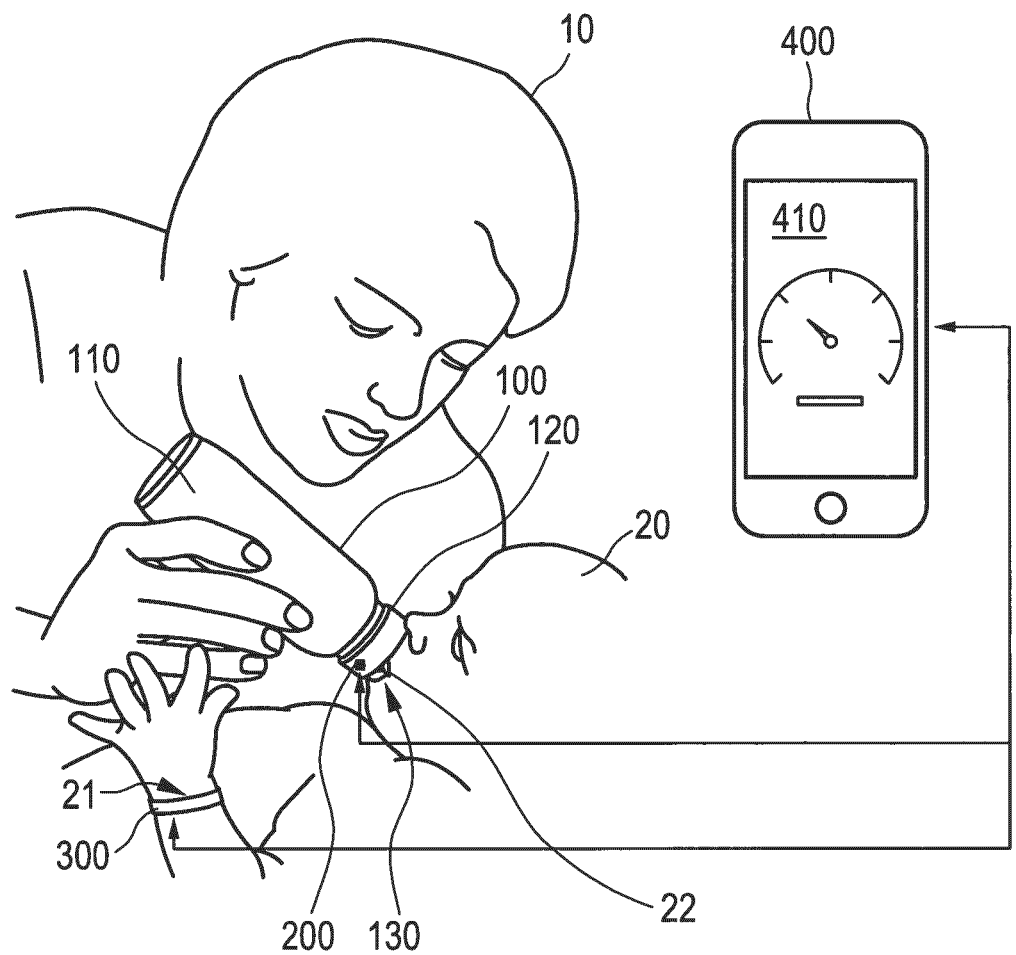
FIG. 1 shows a schematic representation of a baby during the feeding procedure.

FIG. 1 shows a schematic representation of a baby during the feeding procedure. In FIG. 1, a mother 10 is feeding its baby 20 with a baby bottle 100. The baby bottle 100 comprises a container 110 containing liquid like milk, an adapter 120 and a teat 130. The teat 130 is inserted into the mouth 22 of the baby 20 and the baby initiates a sucking behavior to extract the liquid (milk) from the container 110. The teat has a number of holes or apertures to let fluid (like milk) through.

A stress level detection sensor 300 can be attached for example to a wrist 21 of a baby. The stress level detection sensor is implemented in FIG. 1 as a heartrate sensor 300.

A suction frequency sensor 200 is arranged in or attached to the baby bottle 100 in order to determine the sucking frequency of the baby.

The output of the suction frequency sensor 200 and the output of the stress level detection sensor 300 are forwarded to an analyzer 400 which analyses the suction frequency and the detected stress level to determine a drinking behavior of the baby. The analyzer 400 can be implemented as a smart phone, a tablet, a computer, a smart watch or any other smart device. Based on the output of the suction frequency sensor 200 and the stress level detection sensor 300, the analyzer 400 can determine a drinking behavior of the baby bottle during the drinking procedure. The determined drinking behavior can be compared to a typical or predetermined drinking behavior in order to determine whether the flow rate is too high, too low or correct. If the flow rate is too high or too low, this can be outputted by the analyzer 400 to the person 10 feeding the baby. The analyzer 400 can have a display 410 for outputting the flow rate. This may include a recommendation to change the teat if the flow rate is too high or too low.

A typical drinking frequency or suction frequency of a baby is about 1 Hz. If the detected sucking frequency is >1.5 Hz, such a sucking frequency can be considered as too high.

With the monitoring device according to an embodiment (comprising the stress level detection sensor and the suction frequency detection sensor), it is possible to evaluate the flow rate of a baby in a non-obtrusive manner. If the flow rate of the baby bottle is too low or too high for the baby, this could lead to an increased stress of the baby. If the milk flow rate is too low for the infant, the suction frequency will be increased. If the suction frequency is ok but if the stress level is high, this probably means that the milk flow is too high. If the stress levels are high and the suction frequency is high, this probably means that the milk flow rate is too low. If the stress levels are low and the suction frequency is ok, then this probably means that the milk flow rate is ok.

If the milk flow rate is too low, this could mean that the teat must be changed to a teat having larger or more holes or apertures. If the milk flow rate is too high, this could mean that the teat must be exchanged for a teat with smaller or less holes. This information can be outputted by the analyzer.

The stress level detection can be performed using a vital signs sensor like a heartrate sensor. The heartrate sensor can for example be an optical sensor like a PPG sensor detecting the heartrate of a user. Such a sensor is advantageous as it can detect a heartrate of a user in a non-obtrusive manner.

Typically, such a PPG heartrate sensor can detect a heartrate of a user and can output an electrical signal which can be analyzed in an analyzer.

The determination of a stress level from the heart rate can be carried out in known manner. In particular, the deviation from a rest heart rate for that particular baby correlates with a stress level.

Thus, a normal heart rate for the baby may first be determined, for example at the beginning of a feeding routine (before the baby is stressed by the inability to feed correctly). This rest rate may for example be established in a first period, for example of less than 30 seconds, for example less than 20 seconds or even less than 10 seconds. A heart rate increase during feeding from this base reference is then indicative of increased stress. The system may store information about the particular baby to enable a more rapid determination of the reference heart rate level for that baby.

The increased stress may be the result of taking on too much milk. This stress is similar to the stress of potential drowning and is the fight or flight response, by which hormones are generated which influence the autonomic nervous system.

However, the increased stress may instead be the result of the inability to draw sufficient milk. This stress is more akin to an emotional frustration rather than the fight or flight response. However, it may also result in (different) hormone generation which leads to an increased heart rate.

These two possible causes of increased stress are able to be distinguished by additionally taking account of the sucking frequency. The sucking frequency will increase if the baby is unable to draw sufficient milk and will decrease if the baby is taking on an excessive milk quantity.

Hormones which respond to the stress level for example are cortisol and testosterone.

The stress caused by the flight or flight response or by anger/frustration may be detected by other sensing modalities, instead of, or as well as, using heart rate. Some detection approaches are possible using current technologies and others may be detectable more easily with future technologies. For example, current technologies may be invasive (e.g. needing a blood sample) in some cases, whereas future technologies may enable measurements non-invasively and may therefore be suitable during bottle feeding.

The hormones which are generated may themselves be detected. Similarly, the brain activity associated with the stress, and the generation of those hormones, may be monitored.

Pupil dilation may be measured using image processing. The pupils dilate in response to stress.

Skin color changes to a more red color (with increased blood perfusion) during periods of anger or frustration, and this may again be measured using image processing.

Other physiological effects which may be monitored are shaking, perspiration (monitored based on electrodermal activity sensing), and breathing rate.

One or more such physiological parameters may be monitored, and default thresholds may be set which define the boundary between the normal (unstressed) response and a response in the event of heightened stress levels. Thus, a baseline level for one or more monitored parameters may be defined, which sets the boundary between a low stress state and a high stress state.

It is known to monitor of the stress level of a baby, for example as disclosed in GB 2 504 299. This system is based on heart rate monitoring and electrodermal activity sensing.

The stress level may simply be determined to be normal (low) or abnormal (high), so a binary indication is sufficient. However, a multi-level stress indication is also possible.

Similarly, the eventual output notification may be a binary indication, namely "too much" or "too little". Again, a multi-level indication is also possible.

According to an embodiment, the analyzing of the suction frequency detection and the heartrate detection can optionally be performed in real time. The analyzer 400 can be embodied as a smart device. A communication between the heartrate detection sensor and the suction frequency detection sensor 300, 200 can be performed wirelessly such that the analyzer 400 can receive the sensor data in real time. Accordingly, an optical heartrate sensor can be used as a stress level detection sensor in order to detect the stress level of the baby.

The suction frequency detection sensor 200 can be an optical sensor, an audible sensor, and a pressure sensor and/or an accelerometer. An optical sensor can be used to detect changes of the baby, for example changes of the shape of the chin of the baby. Furthermore, the optical suction frequency detection can be used by analyzing images of the baby. The audible sensor can be used to detect drinking noises of the baby from which a suction frequency can be determined. A pressure sensor can be used in the bottle or in the mouth in order to perform pressure measurements. From these pressure measurements, alternating pressures containing the suction frequency can be determined.

According to an embodiment, the teat 130 is able to adapt a flow rate for example by closing and opening the holes or apertures in the teat. The teat is able to adapt a flow rate based on the output of the analyzer which corresponds to a recommendation to adapt a flow rate of the teat. Thus, the baby bottle can automatically adapt or adjust the flow rate.

Figure 2:
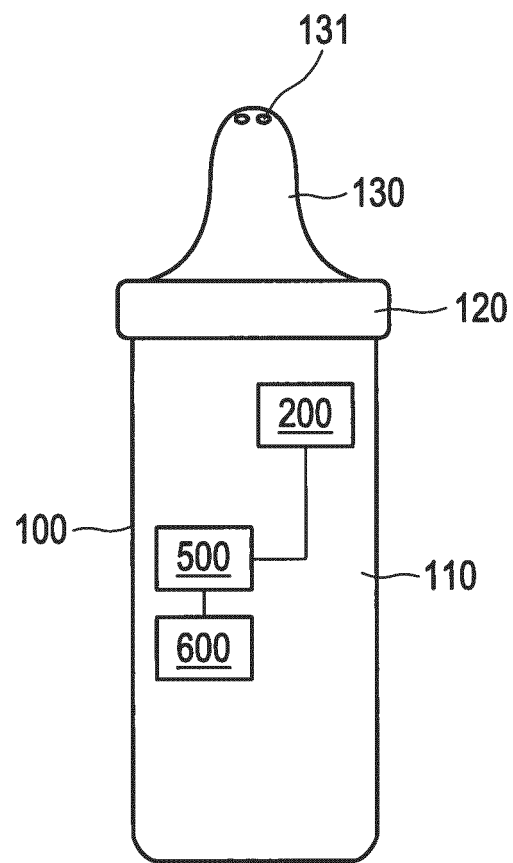
FIG. 2 shows a schematic representation of a baby bottle.

FIG. 2 shows a schematic representation of a baby bottle. The baby bottle 100 comprises a container 110, an adapter 120 and a teat 130 with at least one adjustable aperture 131. The baby bottle 100 furthermore may comprise a suction frequency sensor 200, a control device 500 and optionally a receiving unit 600. The receiving unit 600 may receive an output signal from the stress level detector 300 or from the analyzer 400. The control unit 500 can adapt a flow rate of the baby bottle. This can be performed by adjusting apertures 131 in the teat or by adjusting an underpressure in the bottle 100.

In this embodiment, the baby bottle can adjust the flow rate automatically based on the feedback from the stress level detector 300 or the analyzer 400. This is advantageous as the parents do not need to worry whether they have used the correct teat 130. The bottle 100 will adjust the flow rate and therefore the output of the milk based on the feedback indicators from the baby (suction frequency, stress level).

The suction frequency detection sensor 200 can also be implemented together with the stress level detection sensor 300 and can for example be worn at the wrist of the baby. Here, the suction frequency detection sensor can be embodied as a noise sensor or microphone to detect the noise and in particular the sucking sounds of the baby. Based on the sucking sounds of the baby, the sucking frequency can be extracted.

The analyzer may implement a machine learning algorithm, which receives the monitored physiological signals and sucking detection signals, in order to assess whether the milk flow rate is too low, to high or acceptable.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A drinking behavior monitoring device, comprising
a stress level detection sensor which is configured to discriminate between at least a high stress level and a low stress level of a baby during a feeding procedure, stress being indicative of a milk flow rate being too low or too high,
a suction frequency detection sensor configured to detect a suction frequency during the feeding procedure, and
an analyzer configured to analyze a drinking behavior of the baby based on the detected stress level and the detected suction frequency,
wherein the analyzer is configured to compare the analyzed drinking behavior with a typical drinking behavior and to output a notification based on the analyzed drinking behavior based on whether the milk flow rate is too low or too high.

2. The drinking behavior monitoring device according to claim 1, wherein the stress level detection sensor comprises at least a heart rate sensor adapted to detect the heart rate of the baby.

3. The drinking behavior monitoring device according to claim 1, wherein a stress level detection sensor is configured to detect a stress level of the baby during a feeding process with a baby bottle having a teat, and wherein a suction frequency detection sensor is configured to detect a suction frequency during the feeding procedure with the baby bottle.

4. The drinking behavior monitoring device according to claim 3, wherein the analyzer is configured to output a recommendation to change the teat of the baby bottle if the analyzed drinking behavior does not correspond to a predetermined drinking behavior.

5. The drinking behavior monitoring device according to claim 3, wherein the teat is configured to adapt a flow rate, and wherein the analyzer is configured to output a recommendation to adapt the flow rate of the teat of the baby bottle.

6. The drinking behavior monitoring device according to claim 1, wherein the drinking behavior comprises a flow rate of liquid during the feeding procedure, and wherein the analyzer is configured to output the notification if an analyzed flow rate does not correspond to a predetermined flow rate range.

7. The drinking behavior monitoring device according to claim 1, wherein the suction frequency detection sensor is attached at or on 1 baby bottle.

8. The drinking behavior monitoring device according to claim 1, wherein the stress level detection sensor and the suction frequency detection sensor are provided in a single device.

9. A method of monitoring a drinking behavior of a baby during a feeding of the baby, comprising using a drinking behavior monitoring device, the method comprising the steps of:
detecting a stress level of a baby with a stress level detection sensor, thereby to discriminate between at least a high stress level and a low stress level, stress being indicative of a milk flow rate being too low or too high,
detecting a suction frequency of the baby with a suction frequency detection sensor,
using an analyzer of the drinking behavior monitoring device to:
analyze a drinking behavior of the baby based on the detected stress level and the detected suction frequency,
compare the analyzed drinking behavior with a predetermined drinking behavior, and
output a notification based on the analyzed drinking behavior and based on whether the milk flow rate is too low or too high.

10. The method of monitoring a drinking behavior of the baby according to claim 9, wherein the detecting the stress level comprises at least monitoring a heart rate.

11. The method of monitoring a drinking behavior of the baby according to claim 9, wherein the suction frequency of the baby is detected with a suction frequency detection sensor at or on a baby bottle, and wherein a feeding of the baby is performed with a baby bottle having a teat.

12. The method of monitoring a drinking behavior of the baby according to claim 9, further comprising outputting a recommendation to change a teat based on the analyzed drinking behavior.

13. A baby drinking bottle, comprising
a container, an adapter and a teat which has at least one aperture,
a drinking behavior monitoring device, comprising
a stress level detection sensor which is configured to detect a stress level of a baby during feeding procedure, thereby to discriminate between at least a high stress level and a low stress level, stress being indicative of a milk flow rate being too low or too high,
a suction frequency detection sensor configured to detect a suction frequency during the feeding procedure, and
an analyzer configured to analyze a drinking behavior of the baby based on the detected stress level and the detected suction frequency, and
a controller adapted to control a flow rate of the baby drinking bottle based on the drinking behavior and based on whether the flow rate is too low or too high.

14. The baby drinking bottle according to claim 13, wherein the controller is adapted to adjust the at least one aperture or an underpressure in the bottle to control the flow rate.

15. A drinking behavior monitoring device, comprising:
a processor; and
a tangible, non-transitory computer readable medium comprising instructions, which when executed by the processor, cause the processor to:
detect a stress level of a baby with a stress level detection sensor, thereby to discriminate between at least a high stress level and a low stress level, stress being indicative of a milk flow rate being too low or too high,
detect a suction frequency of the baby with a suction frequency detection sensor,
cause an analyzer of the drinking behavior monitoring device to:
analyze a drinking behavior of the baby based on the detected stress level and the detected suction frequency,
compare the analyzed drinking behavior with a predetermined drinking behavior, and
output a notification based on the analyzed drinking behavior and based on whether the milk flow rate is too low or too high.

16. The drinking behavior monitoring device according to claim 15, wherein the stress level detection sensor comprises at least a heart rate sensor adapted to detect the heart rate of the baby.

17. The drinking behavior monitoring device according to claim 15, wherein a stress level detection sensor is configured to detect the stress level of the baby during a feeding process with a baby bottle having a teat, and wherein a suction frequency detection sensor is configured to detect a suction frequency during a feeding procedure with the baby bottle.

18. The drinking behavior monitoring device according to claim 17, wherein the analyzer is configured to output a recommendation to change the teat of the baby bottle if the analyzed drinking behavior does not correspond to a predetermined drinking behavior.

19. The drinking behavior monitoring device according to claim 17, wherein the teat is configured to adapt a flow rate, and wherein the analyzer is configured to output a recommendation to adapt the flow rate of the teat of the baby bottle.

20. The drinking behavior monitoring device according to claim 15, wherein the drinking behavior comprises a flow rate of liquid during the feeding procedure, and wherein the analyzer is configured to output the notification if an analyzed flow rate does not correspond to a predetermined flow rate range.

* * * * *